May 25, 1965  T. GARBER  3,185,973
DIFFERENTIAL TRANSFORMERS
Filed Nov. 28, 1962
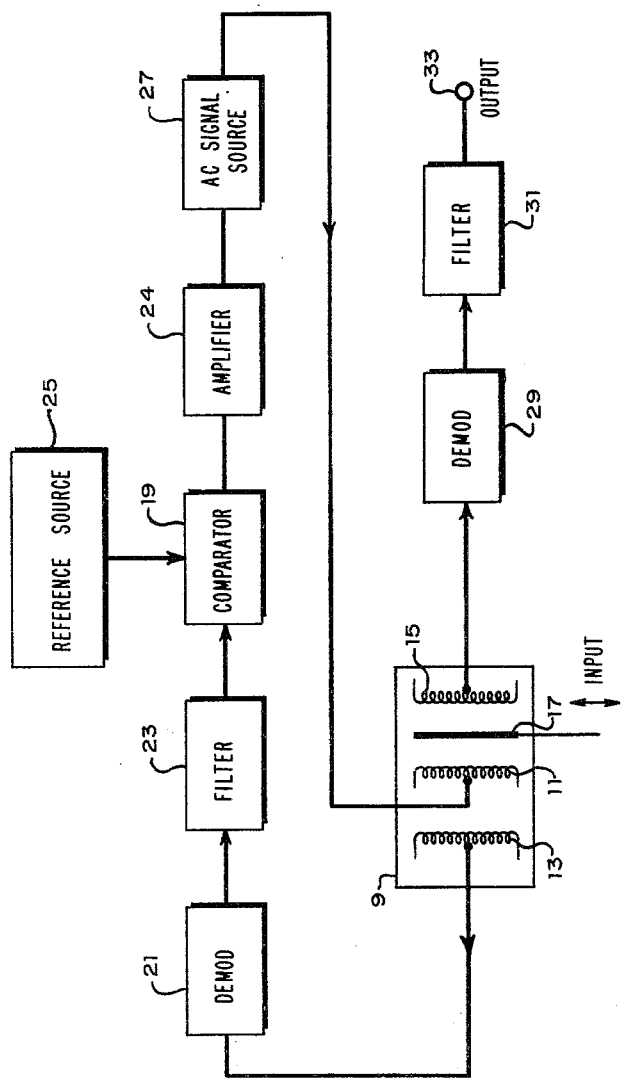
INVENTOR
THOMAS GARBER
BY J. C. Chapman
ATTORNEY 3,185,973
Patented May 25, 1965

3,185,973
DIFFERENTIAL TRANSFORMERS
Thomas Garber, Framingham, Mass., assignor to Hewlett-Packard Company, Palo Alto, Calif., a corporation of California
Filed Nov. 28, 1962, Ser. No. 240,590
6 Claims. (Cl. 340—199)

This invention relates to apparatus for temperature compensating a differential transformer to avoid changes in displacement sensitivity with changes in temperature and excitation signal.

Differential transformers are known devices which convert mechanical displacement and direction to amplitude and phase of an alternating electrical signal. This is done by moving the core of the transformer to vary the coupling between the primary winding and each of a pair of differentially-connected secondary windings. As the core is moved from a given position, coupling between the primary winding and one of the secondary windings increases producing a net increase in output signal. The sensitivity of these devices, defined as the output voltage per unit of linear motion, to mechanical displacement is dependent upon the resistance of the windings, the magnetic properties of the core, the amplitude and frequency of the excitation signal and other factors which may vary with temperature. It is desirable to eliminate the factors which affect the sensitivity of a differential transformer and which are dependent upon temperature and excitation signal in order to maintain a constant relationship between the mechanical and electrical parameters for all operating conditions.

Accordingly, it is a principal object of the present invention to provide a differential transformer and apparatus therefor which produces an output signal of constant amplitude for a given mechanical displacement of the core, independent of variations in temperature and excitation.

It is another object of the present invention to provide a control circuit including a differential transformer which accurately converts mechanical displacement and direction to amplitude and polarity of an electrical signal.

In accordance with the illustrated embodiment of the present invention an auxiliary winding is placed on a differential transformer. The magnetic coupling between the auxiliary winding and the primary winding is made substantially independent of core position. A signal derived from this winding is compared with a reference signal to provide an error signal. The error signal thus tends to vary in accordance with variations in the resistance of the primary and secondary windings, in the magnetic properties of the core material, in the excitation signal and in other factors. As the error signal tends to vary, the amplitude of the alternating signal applied to the primary winding of the differential transformer is so varied that the error signal is maintained substantially at zero amplitude. The output signal derived from the differentially connected secondary windings is thus made independent of changes in temperature and excitation signal.

Other and incidental objects of the present invention will be apparent from a reading of this specification and an inspection of the accompanying drawing which shows a schematic diagram of the transformer and apparatus of the present invention.

Referring to the drawing, there is shown a differential transformer 9 having a primary winding 11, an auxiliary winding 13 and a secondary winding 15. The movable core 17 changes the coupling bewteen the primary winding 11 and the secondary winding 15 as it is displaced.

The auxiliary winding is connected to one input of comparator 19 through serially connected demodulator 21 and filter 23. Reference source 25 is connected to the other input of comparator 19. The output of the comparator 19 is connected to control the amplitude of the alternating signal from A.-C. signal source 27 which is applied to the primary winding 11. The secondary winding 15 is connected through demodulator 29 and filter 31 to the output terminal 33.

Winding 13 is so distributed with respect to the primary that the magnetic coupling between the two windings is substantially independent of the position of core 17. The output signal produced by this winding is thus a measure of the flux density developed in the region of the coils at a given excitation frequency as a result of the primary excitation and the magnetic permeability of the core material. The output signal from auxiliary winding 13 is demodulated and filtered and is compared with a steady voltage from reference source 25 in comparator 19. The error signal which is produced by comparator 19 as the difference between these two signals is amplified by amplifier 24 and is used to control the amplitude of the alternating signal which is applied to the primary winding 11 from A.-C. signal source 27.

In another embodiment of the present invention, the auxiliary winding previously described is provided by combining existing secondary windings in a certain manner rather than by supplying a separate winding. This may be achieved by connecting the secondary windings, having either uniform winding densities or winding densities which vary with coil length, in series bucking relationship. The desired signal is derived from the common connection of said windings and from a signal-divider network connected across the end terminals of the serially connected windings. This scheme provides adequate operating results at a cost reduction in applications where isolation of the secondary windings from the compensating circuitry is not essential.

If the temperature of the differential transformer 9 rises, the resistance of the primary winding increases. Thie tends to reduce the primary current which, in turn, tends to reduce the flux density for a given excitation frequency. The amplitude of the signal from winding 13 tends to drop and the difference between the demodulated output and the reference voltage tends to increase. The A.-C. signal source responds to the increased error signal in such a manner that the rectified-filtered output signal at output terminal 33 is restored to the original value.

The resistance of the secondary winding is also compensated according to the present invention if the load on the auxiliary winding 13 and the load on the secondary winding 15 are equal in proportion to the winding resistances. Under these conditions a given temperature change causes equal percentage changes in the winding resistances and equal changes in the ratios of demodulated outputs to the voltages induced in the windings. Since the present invention stabilizes the output of the filter 23 it follows that the flux density is also adjusted to maintain constant the output from the signal filter 31. The same result is achieved in applications which eliminate the auxiliary winding 13 and which derive the compensating signal directly from the secondary windings.

The circuit of the present invention thus compensates a differential transformer for changes with temperature in winding resistance and permeability of magnetic material and for changes in excitation signal, thereby maintaining the displacement sensitivity of the transformer substantially constant with temperature for a given core displacement.

I claim:
1. Apparatus for converting mechanical displacement to an electrical signal, said apparatus comprising:
a differential transformer having a plurality of windings and having a core so adapted to move with respect to said windings as to vary the coupling between at least a pair of said windings;
a source of alternating signal;
a source of reference signal;
means for deriving from at least one of said windings a control signal having an amplitude independent of core position;
means for combining said control signal and said reference signal to produce an error signal;
means responsive to said error signal to control the alternating signal applied to one of said pair of windings from said source of alternating signal;
and means to derive an output signal related to the displacement of said core from at least the other of said pair of windings.

2. Apparatus for converting mechanical displacement to an electrical signal, said apparatus comprising:
a differential transformer having primary and secondary windings and having a core so adapted to move with respect to said windings as to vary the coupling therebetween;
another winding on said transformer;
the magnetic coupling between said other winding and said primary winding being independent of core position;
a source of alternating signal;
a source of reference signal;
means for comparing the signal from said other winding with said reference signal to produce an error signal;
means responsive to said error signal to control the alternating signal applied to said primary winding;
and means to derive an output signal related to the displacement of said core from said secondary winding.

3. Apparatus for converting mechanical displacement to an electrical signal, said apparatus comprising:
a differential transformer having a primary winding and a pair of differentially connected secondary windings and having a core so adapted to move with respect to said windings as to vary the coupling therebetween;
another winding on said transformer;
the magnetic coupling between said other winding and said primary winding being independent of core position;
a source of alternating signal;
a source of reference signal;
means to derive a signal from said other winding;
means for comparing the signal from said other winding with said reference signal to produce an error signal;
means to apply said alternating signal to said primary winding;
means responsive to said error signal to control the amplitude of said alternating signal;
and means to derive an output signal related to the displacement of said core from said differentially connected secondary windings.

4. Apparatus for converting mechanical displacement to an electrical signal, said apparatus comprising:
a differential transformer having primary and secondary windings and having a core so adapted to move with respect to said windings as to vary the coupling therebetween;
another winding on said transformer;
the magnetic coupling between said other winding and said primary winding being independent of core position;
a source of alternating signal;
a source of reference signal;
means responsive to the signal from said other winding for producing a steady voltage;
means combining said unidirectional reference signal and said steady voltage to produce an error signal;
means responsive to said error signal to control the alternating signal applied to said primary winding from said source of alternating signal;
and means to derive an output signal related to the displacement of said core from said secondary winding.

5. Apparatus for converting mechanical displacement to an electrical signal, said apparatus comprising:
a differential transformer having a primary winding and a pair of secondary windings and having a core so adapted to move with respect to said windings as to carry the coupling between said primary winding and each of said secondary windings;
another winding on said transformer;
the magnetic coupling between said other winding and said primary winding being independent of core position;
a source of alternating signal;
a source of D.C. voltage;
rectifier means for converting the signal on said other winding to a steady voltage;
means for comparing said steady voltage and said D.C. voltage to produce an error signal;
means responsive to said error signal to control the alternating signal applied to said primary winding;
means connecting said pair of secondary windings in series bucking relationship;
and means to derive an output signal related to the displacement of said core from said serially-connected secondary windings.

6. Apparatus for converting mechanical displacement to an electrical signal, said apparatus comprising:
a differential transformer having a primary winding and a pair of secondary windings and having a core so adapted to move with respect to said windings as to vary the coupling therebetween;
another winding on said transformer;
the magnetic coupling between said other winding and said primary winding being independent of core position;
a source of alternating signal;
a source of reference signal;
means for comparing the signal from said other winding with said reference signal to produce an error signal;
means responsive to said error signal to control the alternating signal applied to said primary winding;
means connecting said pair of secondary windings in series bucking relationship;
the winding densities of each of said secondary windings varying with length of the winding in opposite directions;
and means to derive an output signal related to the displacement of said core from said serially-connected secondary windings.

No references cited.

NEIL C. READ, *Primary Examiner.*